United States Patent [19]

Neal et al.

[11] Patent Number: 4,579,373
[45] Date of Patent: Apr. 1, 1986

[54] INSULATED CONCENTRIC TUBING JOINT ASSEMBLY

[76] Inventors: William J. Neal, 1700 Rivercrest Dr., #1412, Sugarland, Tex. 77478; Robert V. Verity, 1456 Domingo Rd., Fullerton, Calif. 92633

[21] Appl. No.: 785,011

[22] Filed: Oct. 7, 1985

Related U.S. Application Data

[63] Continuation of Ser. No. 395,129, Jul. 6, 1982, abandoned.

[51] Int. Cl.[4] ............................................. F16L 59/14
[52] U.S. Cl. ........................................ 285/47; 29/446; 29/455 R; 138/149; 285/138
[58] Field of Search ................... 285/47, 53, 393, 392, 285/138; 138/149; 29/446, 455 R

[56] References Cited

U.S. PATENT DOCUMENTS

| | | | |
|---|---|---|---|
| 861,828 | 7/1907 | Grindrod et al. | 285/392 X |
| 2,805,871 | 9/1957 | Hammon | 285/393 X |
| 3,928,903 | 12/1975 | Richardson et al. | 285/47 X |
| 4,332,401 | 6/1982 | Stephenson et al. | 285/47 |
| 4,340,245 | 7/1982 | Stalder | 285/53 |
| 4,341,392 | 7/1982 | van Dongeren | 285/138 X |
| 4,396,211 | 8/1983 | McStravick et al. | 285/47 |
| 4,415,184 | 11/1983 | Stephenson et al. | 285/47 |
| 4,423,778 | 1/1984 | Goldsmith | 285/138 X |

Primary Examiner—Thomas F. Callaghan
Attorney, Agent, or Firm—Arnold S. Cohn

[57] ABSTRACT

An insulated pipe assembly and joint apparatus and method for assembly thereof utilized in hydrocarbon recovery steam processes whereby a pre-tensile stressed tubing and pre-compressive stress casing are assembled with a sealably threaded combination coupling, this said assembly being a pre-assembled unit which ultimately in application is strung with additional units and held together with a plurality of standard pipe couplings.

4 Claims, 4 Drawing Figures

U.S. Patent   Apr. 1, 1986   4,579,373

INSULATED CONCENTRIC TUBING JOINT ASSEMBLY

CONTINUATION APPLICATION

This application is a continuation application based on the applicant's pending application Ser. No. 395,127, filed July 6, 1982 and now abandoned.

CROSS REFERENCES TO RELATED APPLICATIONS

There are no cross-references in this Application for Letters Patent.

FEDERALLY SPONSORED RIGHTS

There are no rights to any inventions made under or in conjunction with any Federally Sponsored Research and Development Programs.

BACKGROUND OF THE INVENTION

The field of this invention is in connection with the end threaded and intermediate annularly insulated tubular conduits utilized in the steam injection of oil wells. In the recovery of high viscosity hydrocarbons it is common practice to supply high temperature steam to the producing formation. The steam is directed to the formation through a tubing string which is hung from the surface. The tubing string is made up of multiple lengths with threaded end connections to facilitate installation into and removal from the well. It is common practice to insulate the outer surface of the tubing to prevent heat loss and maintain the enthalpy of the steam. The well environment usually requires that this insulation be protected from abrasion and contact with liquids by an outer jacket, or casing. The tubing, insulation, and outer casing are preassembled in individual lengths to facilitate installation into and removal from the well.

Since the tubing and casing are therefore exposed to different temperatures, the linear expansion rate of the tubing and of the outer casing are different. Due to this fact, there are typically three (3) types of joints presently used which so connect the outer casing to the tubing. The joints are either hard, flexible, or slip-type. In a hard joint the tubing and casing are welded together on the body of the tubing a short distance from each end. The exposed tubing end connections are used to join adjacent lengths, and therefore the tubing becomes the principal tensile load carrying member. The high strength steel tubing, normally used in this application, has poor weldability. Leakage or tensile failure often occurs in this type of joint due to stress cracks that develop in the weld or in the heat affected zones of the tubing.

Flexible joints are often used which utilize bellows type devices to seal the annular insulation space between the tubing and outer jacket while allowing relatively free expansion of the tubing with respect to the outer casing. A potential weakness of this design is the susceptability of the relatively thin metal bellows to corrosion failure.

Slip joints have been utilized which usually consist of a piston ring or packing material arrangement. The disadvantage of this joint is the leakage potential inherent in slip joints.

An object of this invention is to provide a prestressed insulated concentric tubing and outer casing unit, and a mechanical and self sustaining combination coupling connecting the inner tubing and outer casing.

A further object of the invention is to provide a joint which is leak resistant and positively sealed.

A further object of the invention is to provide a joint having no welds which are critical to its structural integrity.

A further object of the invention is to provide a pipe length assembly which can be connected to other such utilizing standard threaded couplings.

The foregoing and similar objects, advantages and features may be achieved by the INSULATED CONCENTRIC TUBULAR JOINT ASSEMBLY for conveying heated fluids such as steam and the like from the ground source to the down hole formation as described in the following description read in conjunction with the drawings and claims.

DESCRIPTION OF THE PRIOR ART

In Trucano, U.S. Pat. No. 1,140,633, an insulating system is disclosed. This system utilizes a threaded coupling which connects the inner tubing. A flanged coupling is welded to the outer casing. The difference between the subject invention and that in Trucano is that Trucano requires welding and the instant invention does not. The joining of pipe sections in Trucano is accomplished through a flanged joint.

In Ricker, U.S. Pat. No. 1,909,075, a coupling for double pipe sections is disclosed. Concentric spacers are welded to the inner pipe and then welded to the outer pipe after first cutting into the outer pipe at the outer weld locations. The subject matter of this invention does not require welding. A sealing collar communicates with the inner tubing and is mechanically self sealing in reliance on the compressive contact between the end of the outer casing and the mating surface of the collar.

In Alexandru, U.S. Pat. No. 3,574,357, a typical insulated tubing assembly for a deep well string is disclosed. The inner tube has an enlarged upper end and a lower end that is self-centralizing. This slip joint allows the longitudinal expansion thereof. The difference between the invention in hand and Alexandru uses the slip joint concept and the subject invention is a hard type joint.

DESCRIPTION OF THE DRAWINGS

Referring to FIG. 1, an outer casing 25 vertically oriented is illustrated. In actual use, a plurality of said outer casing 25 would be utilized, each one being connected to the adjacent one by utilizing the outer coupling 50. Each outer coupling 50 connects and seals the outer diameter of each adjacent said outer casing 25.

Referring to FIG. 2, an assembly view of the INSULATED CONCENTRIC TUBULAR JOINT ASSEMBLY is illustrated. The innermost member is tubing 20. The inside diameter of said tubing 20 is in contact with steam and other pressurized media which is transmitted to the down hole formation. For the most part said tubing 20 is constant thickness until at the proximity of each end a transition zone 23 is provided. The inside diameter of said tubing 20 remains constant throughout the length of said tubing 20. At each end of the tubing 10 a tapered male thread 22 is cut which communicates with a combination coupling 30 at the combination coupling female tapered thread 32. The combination coupling 30 is axially positioned on the tubing male thread 22 at the time when the tubing 20 is hot and the outer casing 25 is cold. The seating of the said combination coupling 30 with the said outer casing 25 occurs at each chamfered end of said outer casing 25 and combination coupling mating surface 35. Prior to the assembly of the said outer casing 25, tubing 20 and two (2) each of said combination coupling 30, a plurality of centralizing rings 61 and insulation 60 is provided within the annular space between said outer casing 25 and said inner tubing 20. Combination couplings 30 are externally taper threaded after final assembly with outer casing male tapered thread 29 and combination coupling outer thread 33 (see FIG. 3). The said outer casing male tapered thread 29 and combination coupling male tapered thread 33 is a common thread continuously cut at the same time after final assembly of tubing 20, the combination coupling 30, and outer casing 25. Each said assembly is serially connected utilizing a standard casing coupling 50 and maintaining the gap 70 vis-a-vis the outer coupling inner thread 51, outer casing male thread 29 and combination coupling outer thread 33.

Referring to FIG. 3, a section view of the combination coupling 30 is illustrated. Its inner diameter is fully threaded with combination coupling inner thread 32. The centralizing diameter 34 slideably communicates with the inner diameter of outer casing 25 so centralizing the sub-assembly. The combination coupling mating surface 35 is cut at an angle 36 which so seats with chamfer 26 (see FIG. 4). The combination coupling outer thread 33 is continuously cut at the same time as the outer casing male thread 29 after final assembly.

Referring to FIG. 4, the end of the outer casing 25 is illustrated. Each said end is chamfered to an angle 36 to so seat and communicate with combination coupling mating surface 35 (see FIG. 3).

SUMMARY OF THE INVENTION

Figure 1:
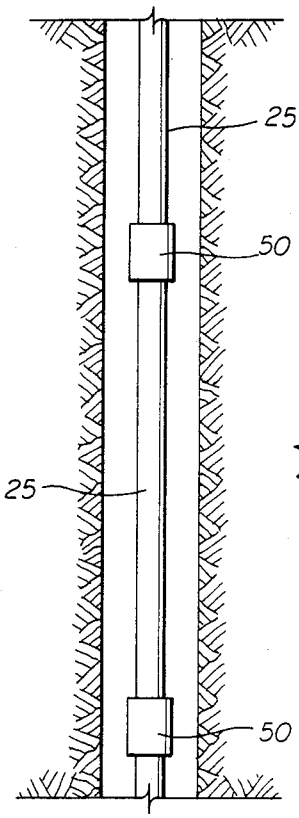
In FIG. 1 the outward vertical appearance of the outer casing 25 is illustrated.
Figure 3:
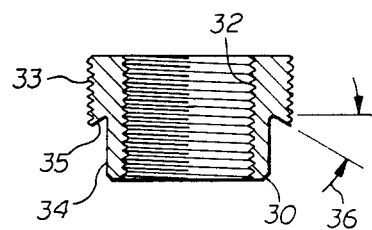
In FIG. 3, a section view of the inner coupling 30 is illustrated.
Figure 4:
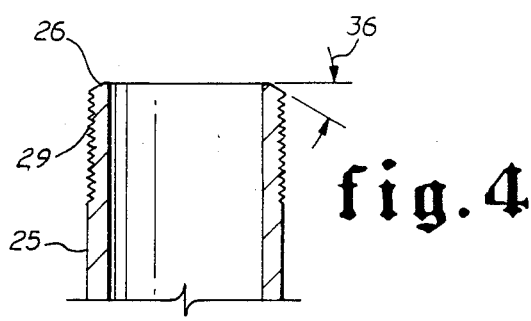
In FIG. 4, the end preparation of outer casing 25 is illustrated.
Figure 2:
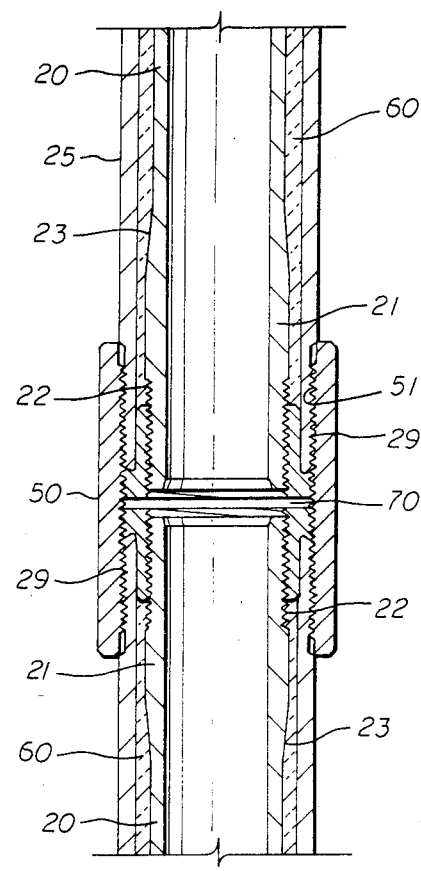
In FIG. 2 a section view of the INSULATED CONCENTRIC TUBULAR JOINING ASSEMBLY is illustrated.
Figure 2:
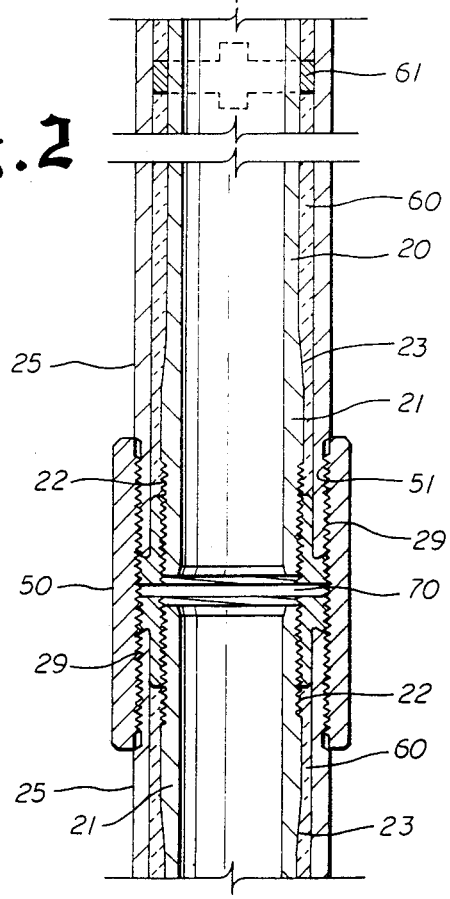

An inner tubing member is externally taper threaded at each end to facilitate the communication of a combination coupling. Each inner tubing end is of increased thickness of strength reinforcement.

The combination coupling is internally threaded to communicate with each end of an inner tubing. The two (2) outside diameters are stepped, the smaller diameter being utilized to centralize itself within the inside diameter of an outer casing. The juncture of the diameters is prepared in an angulated shape to provide a seating surface. The outside diameter is of sufficient diameter to allow itself to be trued and simultaneously threaded with each end of the outer casing. The outer casing is cut to a finished length, based on the length of its respective inner tube, and the magnitude of prestress required in the assembled unit. Each end of the outer casing is then chamfered before assembly.

The final assembly of the foregoing is accomplished by heating the inner tubing to expand its length and allow installation of the second combination coupling without interference with the outer casing. The tubing is heated by insertion of an electrical resistance heater or like heating machanism or device into the tubing bore. After assembly and withdrawal of the heating device, the tubing and outer casing return to thermal equilibrium, establishing a tensile prestress in the tubing and a corresponding compressive prestress in the outer casing.

The magnetic or prestress is such that in the intended steam injection service, the tubing and outer casing approach minimum acceptable within design limit stress levels.

A standard casing coupling 50 permits the assembly of a plurality of INSULATED CONCENTRIC TUBULAR JOINT ASSEMBLY during field installation.

DESCRIPTION OF THE PREFERRED EMBODIMENTS

During the steam injection process for production of high viscosity hydrocarbons from the producing formation, it is necessary to supply high pressure and high temperature steam to the producing formation as an aid to encourage the flow of high viscosity oil. The INSULATED CONCENTRIC TUBULAR JOINT ASSEMBLY permits the injection of said steam with a minimum heat loss. The said INSULATED CONCENTRIC TUBULAR JOINT ASSEMBLY relies on taper threaded connections instead of welded connections for its structural integrity.

High temperature steam is exposed to the inner tubing 20 which is insulated from the outer casing; therefore, marked temperature gradients exist. The inner tubing temperature is substantially greater than the temperature of the outer casing. In hard type joints which rely on welding to join the tubing and outer casing, these thermal gradients cause severe stress levels at the juncture point of the inner tubing and outer casing. The calculation of stress is difficult to predict due to the influence of stress concentration factors which are dependent on the joint types. It is ideal not to have high levels of stress at the heat effected zone of welded joints.

An embodiment of this invention is the assembly procedure of an inner tubing and outer casing which results in a low and predictable stress level during steam injection service. This embodiment permits the stress levels to be minimized in the following manner. The assembly of the INSULATED CONCENTRIC TUBULAR JOINT ASSEMBLY occurs when the inner tubing 20 with one (1) combination coupling 30 threadably connected to one end, and a plurality of centralizing rings 61 and insulation 60, is then centrally located within an outer casing 25 which is at room or ambient temperature. The inner tubing 20 is then heated to expand it sufficiently in the axial direction to allow the second combination coupling 30 to be threadably connected to the remaining end of the inner tubing 20, upon cooling, without interference with the outer casing 25. The outer casing 25 and combination coupling mating surface 35 seat on each other placing the outer casing 25 at a predictable compressive stress level and the inner tubing 20 at a predictable tensile stress level. In the operational mode, the tubing and outer casing operate at near zero stress, an ideal condtion.

Each end of the tubing 20 is of heavier thickness to accommodate the tubing male thread 22. A combination coupling 30 is threadably connected to each end of the inner tubing 20. The said combination coupling 30 has a centralizing diameter 34 which communicates centrally with the inside diameter of the outer casing 25 and inner tubing 20 and is sealed at each end of this sub-assembly by means of the tapered thread 32 in the combination coupling 30.

At the conclusion of the assembly of the tubing 20, outer casing 25 and combination coupling 30, the outer diameter of the ends of the outer casing 25 which coincide with the outer diameter of the combination coupling 30 are trued, turned and simultaneously taper threaded. The stringing of said assemblies are then so connected utilizing a plurality of industrially standard casing couplings 50.

It is intended and desired that the embodiments shown and described in detail herein shall be deemed illustrative in nature and not restrictive in order that various modifications thereof will be apparent to those skilled in the art and be applied thereto without departing from the scope of the present invention.

Having just described the invention what we claim being new is:

1. A composite insulated tubing joint for use in a tubular string in an oil well including;

inner and outer concentrically disposed tubing members, each having outer threaded ends:

tubular coupling members at each end of said tubing members, said coupling members respectfully having an outer wall surface with stepped first and second diametrical portions defining an abutment shoulder;

each of said tubular coupling members having internal threads for threaded coupling to the outer threads on an end of said inner tubing member, each of said first diametrical portions being disposed within the inner wall of said outer tubing member and each of said second diametrical portions extending to the outer surface of said outer tubing member;

said tubing coupling members being threadedly adjustable on said inner tubing member when said inner tubing member is heated to engage the abutment shoulders of the coupling members with an end of an outer tubing member so that upon cooling of said inner tubing member said outer tubing member is under compression and said inner tubing member is under tension;

each of said tubular coupling members and said outer tubing member having a common continuous external threaded at each end of said outer tubing member when said inner tubing member is under tension and said outer tubing member is under compression for coupling to an internally threaded casing coupling member.

2. The apparatus as set forth and defined in claim 1, wherein said composit tubing joint has a plurality of centralizing rings disposed between said inner and outer concentrically disposed tubing members along the length of said tubing members between the tubular coupling members, and insulation material disposed between said centralizing rings.

3. A method of constructing a composite tubing joint for use in an oil well including the steps of:

disposing an inner tubing member within an outer tubing member where the inner tubing member has externally threaded ends;

disposing insulating material between the inner and outer tubing members along their length;

threadedly attaching tubular coupling members to the externally threaded ends of the inner tubing joint until a shoulder on a coupling member engages the end surface of the outer tubing member and where each of the coupling members has an outer surface which has the same diameter as the outer surface of the outer tubing member;

heating the inner tubing member from ambient temperature to an elevated temperature to elongate the inner tubing member and tightening the coupling members while the inner tubing member is at an elevated temperature to bring the coupling members into engagement with the end surfaces of the outer tubing member;

returning the temperature of the inner tubing member to ambient temperature thereby placing the outer tubing member under compression and the inner tubing member under tension; and forming a continous externally threaded surface on the outer surface of the coupling member and on the ends of the outer tubing member for threaded coupling to standard casing couplings.

4. The method as set forth in claim 3 wherein the heating of the inner tubing member is such that the elongation of the inner tubing member is sufficient to equalize the compression of the outer tubing member to the tension of the inner tubing member for operational conditions in a well bore.

* * * * *